United States Patent
Kumabe et al.

(10) Patent No.: US 8,214,124 B2
(45) Date of Patent: Jul. 3, 2012

(54) CRUISE CONTROL SYSTEM AND METHOD

(75) Inventors: Hajime Kumabe, Kariya (JP); Yasuhiro Nakai, Kariya (JP); Satoshi Niwa, Nagoya (JP); Shotaro Fukuda, Obu (JP); Masayoshi Takeda, Kariya (JP); Hiroyuki Kodama, Kariya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 1072 days.

(21) Appl. No.: 12/154,786

(22) Filed: May 27, 2008

(65) Prior Publication Data
US 2008/0300766 A1    Dec. 4, 2008

(30) Foreign Application Priority Data
May 28, 2007    (JP) ................................ 2007-140546

(51) Int. Cl.
*B60T 8/32* (2006.01)
(52) U.S. Cl. .............................. 701/93; 701/72; 340/903
(58) Field of Classification Search .................... 701/41, 701/71, 72, 93, 95, 96; 340/436, 437, 438, 340/903, 990
See application file for complete search history.

(56) References Cited

U.S. PATENT DOCUMENTS

| | | | | |
|---|---|---|---|---|
| 4,709,595 A * | 12/1987 | Hayama | ......................... | 477/108 |
| 5,012,419 A * | 4/1991 | Yamamoto | ...................... | 701/95 |
| 5,771,007 A * | 6/1998 | Arai et al. | ...................... | 340/903 |
| 6,208,927 B1 * | 3/2001 | Mine et al. | ...................... | 701/70 |
| 6,725,145 B1 * | 4/2004 | Takahashi | ....................... | 701/70 |
| 6,868,324 B2 * | 3/2005 | Matsumoto et al. | ............. | 701/72 |
| 6,968,266 B2 * | 11/2005 | Ahmed-Zaid et al. | ........... | 701/96 |
| 6,970,779 B2 * | 11/2005 | Kagawa et al. | .................. | 701/93 |
| 7,252,346 B2 * | 8/2007 | Higuchi | ......................... | 303/146 |
| 7,266,438 B2 * | 9/2007 | Kellum et al. | ................... | 701/93 |
| 7,512,475 B2 * | 3/2009 | Perisho et al. | ................... | 701/96 |
| 7,734,404 B2 * | 6/2010 | Shiiba et al. | ..................... | 701/70 |
| 7,751,962 B2 * | 7/2010 | Yamamura et al. | .............. | 701/93 |
| 7,792,624 B2 * | 9/2010 | Nakamura et al. | .............. | 701/72 |
| 2003/0014174 A1 * | 1/2003 | Giers | .............................. | 701/70 |
| 2004/0148077 A1 * | 7/2004 | Yasui et al. | ..................... | 701/41 |
| 2006/0069481 A1 * | 3/2006 | Kubota et al. | .................... | 701/41 |

FOREIGN PATENT DOCUMENTS
DE    198 48 236    4/2000
(Continued)

OTHER PUBLICATIONS

Office action dated Aug. 27, 2010 in corresponding German Application No. 10 2008 025174.7.

*Primary Examiner* — Helal A Algahaim
(74) *Attorney, Agent, or Firm* — Harness, Dickey & Pierce, PLC (57) ABSTRACT

In a cruise control system for a vehicle, a cruise ECU calculates a cornering resistance applied to the vehicle based upon a steering angle, when a vehicle turns. The cruise ECU calculates a speed reduction amount as a correction vehicle speed based upon the cornering resistance. The cruise ECU subtracts the correction vehicle speed from a set vehicle speed to set a target vehicle speed so that the vehicle speed becomes lower as the cornering resistance is larger. The cruise ECU controls the vehicle speed to be within a permissible speed range of the target vehicle speed.

14 Claims, 6 Drawing Sheets

FOREIGN PATENT DOCUMENTS

| | | |
|---|---|---|
| DE | 698 19 984 | 9/2004 |
| GB | 2 343 016 | 4/2000 |
| JP | 60-233 | 1/1985 |
| JP | 03-258938 | 11/1991 |
| JP | 09-142172 | 6/1997 |
| JP | 10-281776 | 10/1998 |
| JP | 11-042955 | 2/1999 |
| JP | 2003-256999 | 9/2003 |
| JP | 2004-175148 | 6/2004 |

* cited by examiner

CRUISE CONTROL SYSTEM AND METHOD

CROSS REFERENCE TO RELATED APPLICATION

This application is based on and incorporates herein by reference Japanese Patent Application No. 2007-140546 filed on May 28, 2007.

FIELD OF THE INVENTION

The present invention relates to a cruise control system and method which maintain a vehicle speed within a permissible speed range set based upon a target vehicle speed.

BACKGROUND OF THE INVENTION

A conventional cruise control system performs cruise control, which maintains a travel speed of a vehicle at a set vehicle speed set by a vehicle driver as a target vehicle speed or performs adaptive cruise control for maintaining a distance to a preceding vehicle to be constant (for example, U.S. Pat. No. 6,970,779 corresponding to JP 2004-175148A).

In this cruise control system, when a centrifugal force applied to a vehicle traveling at a curve is less than a prescribed threshold value, a set vehicle speed is used as a target vehicle speed. However, when a centrifugal force applied to a vehicle traveling at a curve is more than a prescribed threshold value, a target vehicle speed is reduced to be smaller than a set vehicle speed in accordance with the centrifugal force (for example, JP 60-233U).

It is known that a cornering resistance generated in a vehicle traveling at a curve becomes larger as a steering angle is larger. The steering angle corresponds to an angle (tire slip angle) between a front wheel rotational direction, that is, a direction where front wheels roll, and a vehicle travel direction, that is, a direction where a vehicle is heading and actually travels.

Figure 7:
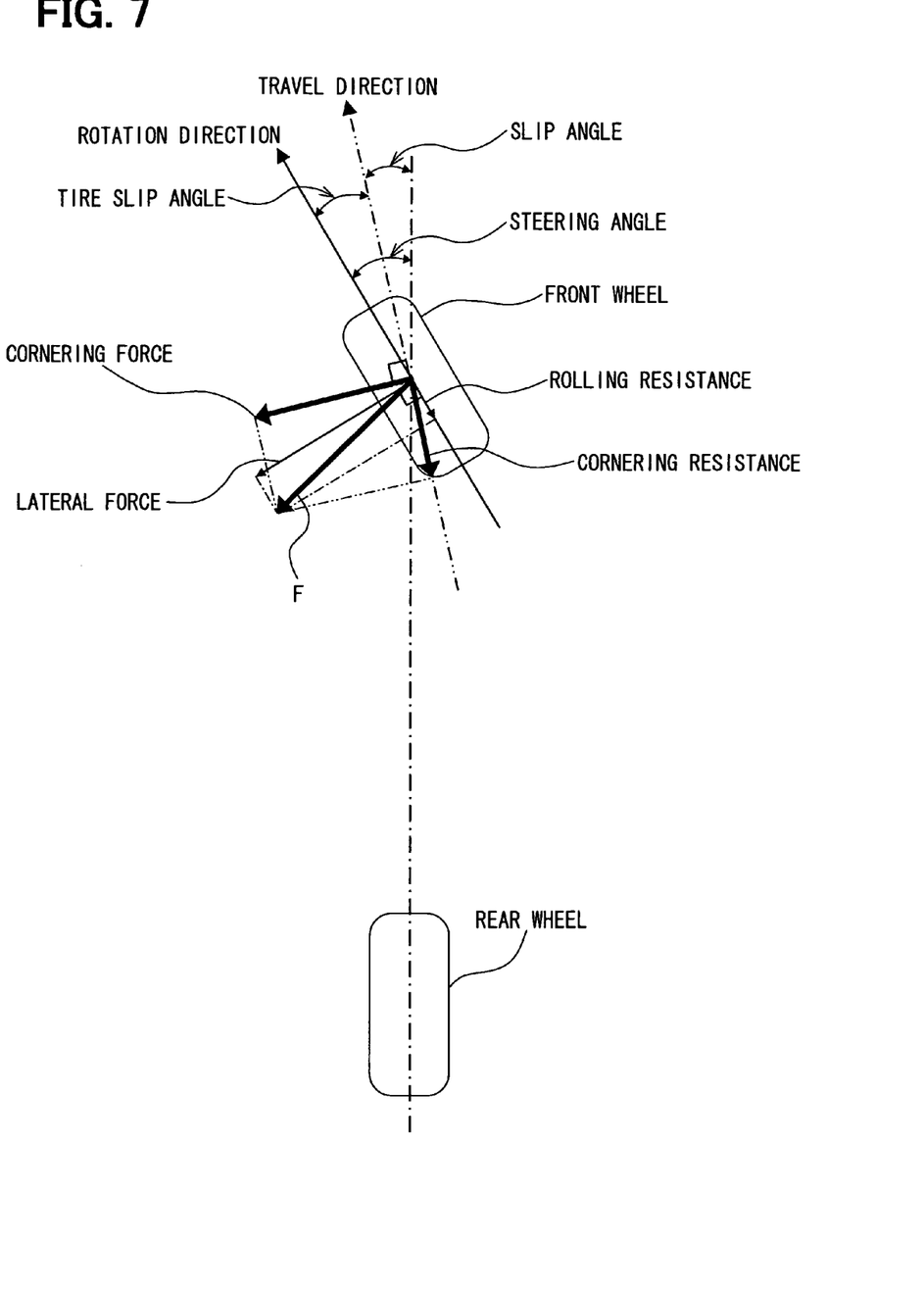
FIG. 7 is a schematic diagram showing a relation among various forces and resistances occurring when a vehicle turns.

This occurs for the following reason. When, for turning a vehicle as shown in FIG. 7, a steering wheel is operated by a driver to apply a steering angle to front wheels of the vehicle, a larger force (lateral force) is generated in a direction at right angles to the front wheel rotational direction in the front wheel of the vehicle due to a friction between a tire and a road surface as a tire slip angle (that is, steering angle) is larger. Among components obtained by dividing a force F obtained by combining a rolling resistance with this lateral force by a vehicle travel (forward) direction axis, one component in a direction perpendicular to the vehicle travel direction is defined as a cornering force and the other component in a direction opposing the vehicle travel direction is defined as a cornering resistance (cornering drag). These components also increase with an increase of the lateral force. It is also known that a speed of the vehicle during traveling is reduced due to this cornering resistance.

Therefore, in the cruise control system disclosed in U.S. Pat. No. 6,970,779, when the vehicle travels at the curve, a control operation for accelerating the vehicle (acceleration control) is performed in such a manner as to compensate for an amount of reduction in vehicle speed due to the cornering resistance (speed reduction amount).

In the cruise control system disclosed in U.S. Pat. No. 6,970,779, however, an acceleration delay occurs in the duration from a time point where the acceleration control of a vehicle is started until a time point where the vehicle actually starts to accelerate, that is, starts to increase a travel speed. In consequence, when a driver performs a return operation of a steering wheel during accelerating the vehicle by compensating for the speed reduction amount, in a case where the slip angle, that is, the cornering resistance is reduced simultaneously with the actual acceleration, the vehicle may rapidly accelerate.

In the cruise control system described in JP 60-233U, in a case where a vehicle travels in a low speed at the curve, a centrifugal force applied to the vehicle is reduced less than the threshold value. As a result, the target vehicle speed is not restricted.

Further, when a vehicle is in the middle of traveling at high speeds at the curve, a centrifugal force more than the threshold value is applied to the vehicle and therefore the target vehicle speed is restricted. However, when the centrifugal force is reduced by a returning operation of the steering wheel along with the switching from the curve to the straight road and thereby the limit to the target vehicle speed is lifted, the vehicle may rapidly accelerate.

That is, in the conventional cruise control system, a vehicle may be accelerated unexpectedly during traveling at the curve or immediately before the switching from the curve to the straight road. This acceleration may not satisfy a driver.

SUMMARY OF THE INVENTION

It is therefore an object of the present invention to provide a cruise control system and method, which are capable of controlling vehicle behaviors to be suitable for a feeling of a driver when a vehicle turns.

According to one aspect of a cruise control system for a vehicle, when a vehicle turns, a target vehicle speed is reduced from a set vehicle speed set as a target vehicle speed when the vehicle travels straight. This reduction is made larger as a speed reduction amount of the vehicle caused when the vehicle turns is larger. The vehicle is controlled to accelerate and decelerate so that a vehicle speed is maintained within a permissible speed range of the target vehicle speed.

Preferably, a cornering resistance generated when the vehicle turns is estimated based upon vehicle information including at least a steering angle and a travel speed of the vehicle acquired at the turning of the vehicle, and the reduction is increased as the estimated cornering resistance is larger.

BRIEF DESCRIPTION OF THE DRAWINGS

Other objects, features and advantages of the present invention will become more apparent from the following detailed description made with reference to the accompanying drawings, in which like parts are designated by like reference numbers. In the drawings.

DETAILED DESCRIPTION OF THE PREFERRED EMBODIMENTS

First Embodiment

Figure 1:
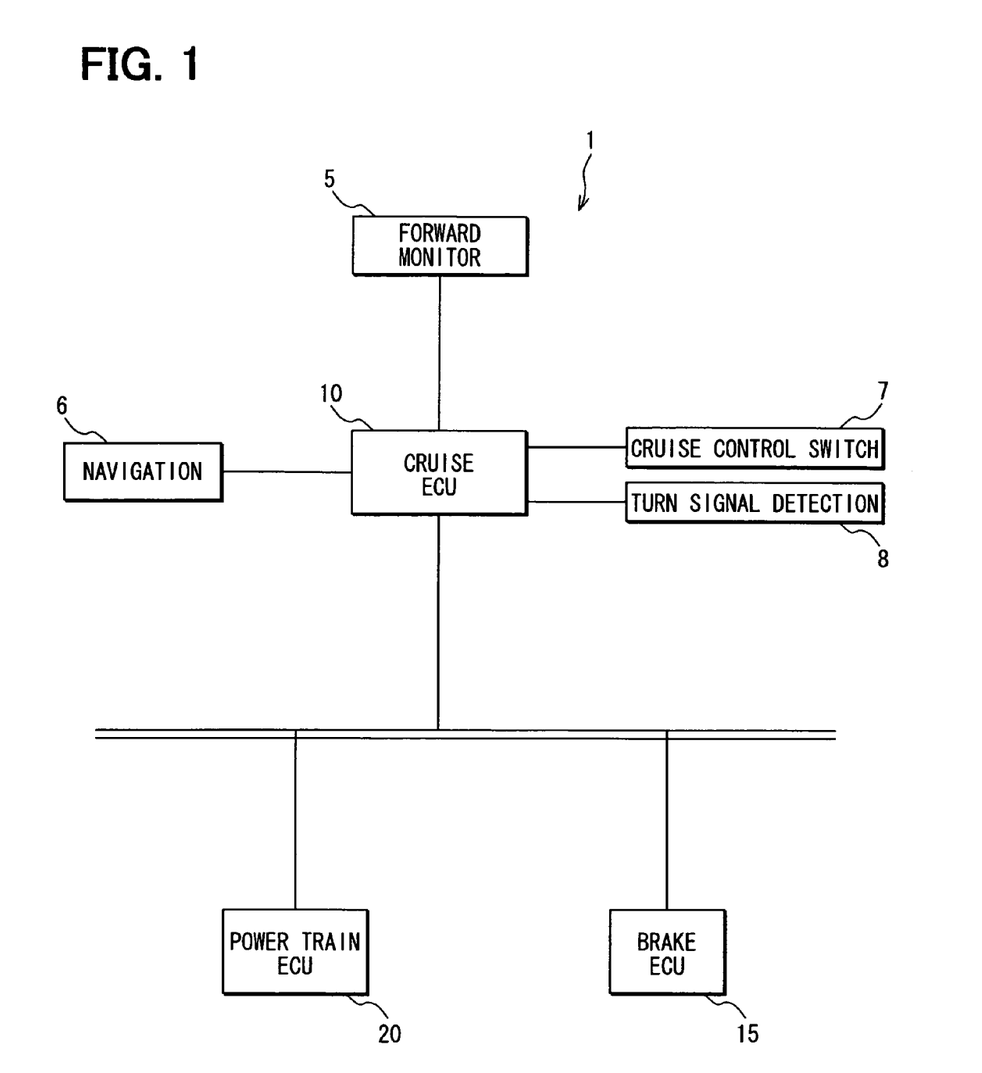
FIG. 1 is a block diagram showing a cruise control system according to a first embodiment of the present invention.

Referring to FIG. 1, a cruise control system 1 is provided with an electronic control unit for cruise control (cruise ECU) 10, an electronic control unit for brake control (brake ECU) 15 and an electronic control unit for power train control (power train ECU) 20. These ECUs are connected with each other through a LAN communication bus. Each of ECUs 10, 15 and 20 is constructed mainly of a known microcomputer including at least ROM, RAM and CPU and is provided with at least a bus control system for communications through the LAN communication bus. The data communications between ECUs performed through the LAN communication bus may adopt a CAN (Control system Area Network) protocol carried out generally in an in-vehicle network.

A navigation unit 6, a cruise control switch 7, a turn signal operation detection unit 8 and the like, and in addition, a forward monitor unit 5 are connected to the cruise ECU 10.

The forward monitor unit 5 is a laser radar sensor that includes a scanning section for scanning a forward area by a laser light and an information processing section for detecting a object based upon the laser light irradiated by the ranging device.

In the forward monitor unit 5, the scanning section irradiates laser light within a certain angle range in the vehicle width direction and the information processing section finds subject vehicle lane probability showing the probability that an object exists on a lane on which a subject vehicle (self-vehicle) travels or attribute information showing attributes of the object (vehicle, non-vehicle, unidentified object and so on), based upon an angle or a distance to the object detected based upon the reflective light, the present vehicle speed received from the cruise ECU 10, an estimated value of a curve curvature radius (estimated R) and the like. Along with this, a collision flag is set to an on-coming vehicle facing and approaching close to the subject vehicle. Further, the subject vehicle lane probability, the attribute information and the collision flag are sent to the cruise ECU 10 as object information including information of the distance from the object, the relative speed to the object and the like. A diagnosis signal of the forward monitor unit 5 itself is also sent to the cruise ECU 10.

Further, the navigation unit 6 is of known construction formed mainly of a position detector for detecting the present position of the vehicle, a map storage section for storing map data, an operational switch group for inputting information, a display section for displaying an image, a microcomputer for controlling them (position detector, etc) and the like.

In the navigation unit 6, the microcomputer acquires map data about the vicinity of the present position from the map storage section based upon the present position of the vehicle detected by the position detector and displays it. Further, the microcomputer superimposes a present position mark of the vehicle or a route to the destination on the map, and performs the processing for making a driver change a vehicle lane. In addition, the navigation unit 6 transmits position information showing the present position of the vehicle, traffic crossing information including at least a distance to the nearest traffic crossing on a traveling road where the vehicle travels and a shape of the nearest traffic crossing, and vehicle lane change information showing a scheduled vehicle lane change to the cruise ECU 10.

Next, the cruise control switch 7 is provided with at least a main switch for activating and stopping the cruise ECU 10, a set switch for starting an inter-vehicle (vehicle-to-vehicle) distance control (adaptive cruise control (ACC)), a cancel switch for terminating the inter-vehicle distance control, an accelerator lever for increasing a set vehicle speed stored in ROM of the cruise ECU 10, a coast lever for reducing the set vehicle speed likewise, and a target inter-vehicle distance setting switch for setting time (target inter-vehicle distance time) required for a subject vehicle to pass over a distance equivalent to a target inter-vehicle distance between the preceding vehicle and the subject vehicle at inter-vehicle distance controlling. It should be noted that this target inter-vehicle distance time can be set within a certain range.

The turn signal operation detection unit 8 is arranged to detect an operation of a turn signal and transmit an operation signal showing the operational state to the cruise ECU 10.

Here, the bake ECU 15 transmits a steering angle (including a steering speed as an operation speed of the steering wheel) from a steering sensor for detecting the steering angle of a vehicle, a yaw rate from a yaw rate sensor for detecting the yaw rate showing a turning state of a vehicle, and further a pedal depressing state (brake) from a bake pedal depressing sensor for detecting the pedal depressing state of a bake pedal to the cruise ECU 10 through the LAN communication bus. Along with these, the bake ECU 15 receives a vehicle-speed controlling flag, target acceleration, a bake demand and the like from the cruise ECU 10. Then, the brake ECU 15 outputs a drive command to a bake actuator or the like for opening/closing a pressure increasing control valve and a pressure reducing control valve equipped in a bake hydraulic circuit for controlling a bake force, based upon an operating state specified from the received information.

The power train ECU 20 transmits the present vehicle speed from a vehicle speed sensor for detecting a vehicle speed of a vehicle, and in addition, a control state of the internal combustion engine and an accelerator pedal positioning state based upon signals from a throttle positioning sensor for detecting a throttle position of the internal combustion engine and from an accelerator pedal positioning sensor for detecting an accelerator pedal position to the cruise ECU 10 through the LAN communication bus. Along with these, the power train ECU 20 receives the vehicle-speed controlling flag, the target acceleration, a fuel cut-off demand and the like, and outputs a drive command to a throttle actuator or the like for adjusting the throttle position of the internal combustion engine, based upon an operating state specified from the received information.

The cruise ECU 10 receives the steering angle, the yaw rate and the brake pedal depressing state from the brake ECU 15 and receives the present vehicle speed, the control state and the accelerator pedal positioning state from the power train ECU 20. The cruise ECU 10 transmits the vehicle speed control flag indicating "in the middle of performing the vehicle speed control" to the brake ECU 15 and the power train ECU 20, based upon a detection signal from the cruise control SW 7. Further, the cruise ECU 10 performs the vehicle speed control processing of transmitting the target acceleration, the fuel cut-off demand and the like to the power train ECU 20, and the target acceleration, the brake demand and the like to the brake ECU 15, as a control command for adjusting a vehicle speed within a prescribed range from a target vehicle speed.

Figure 2:
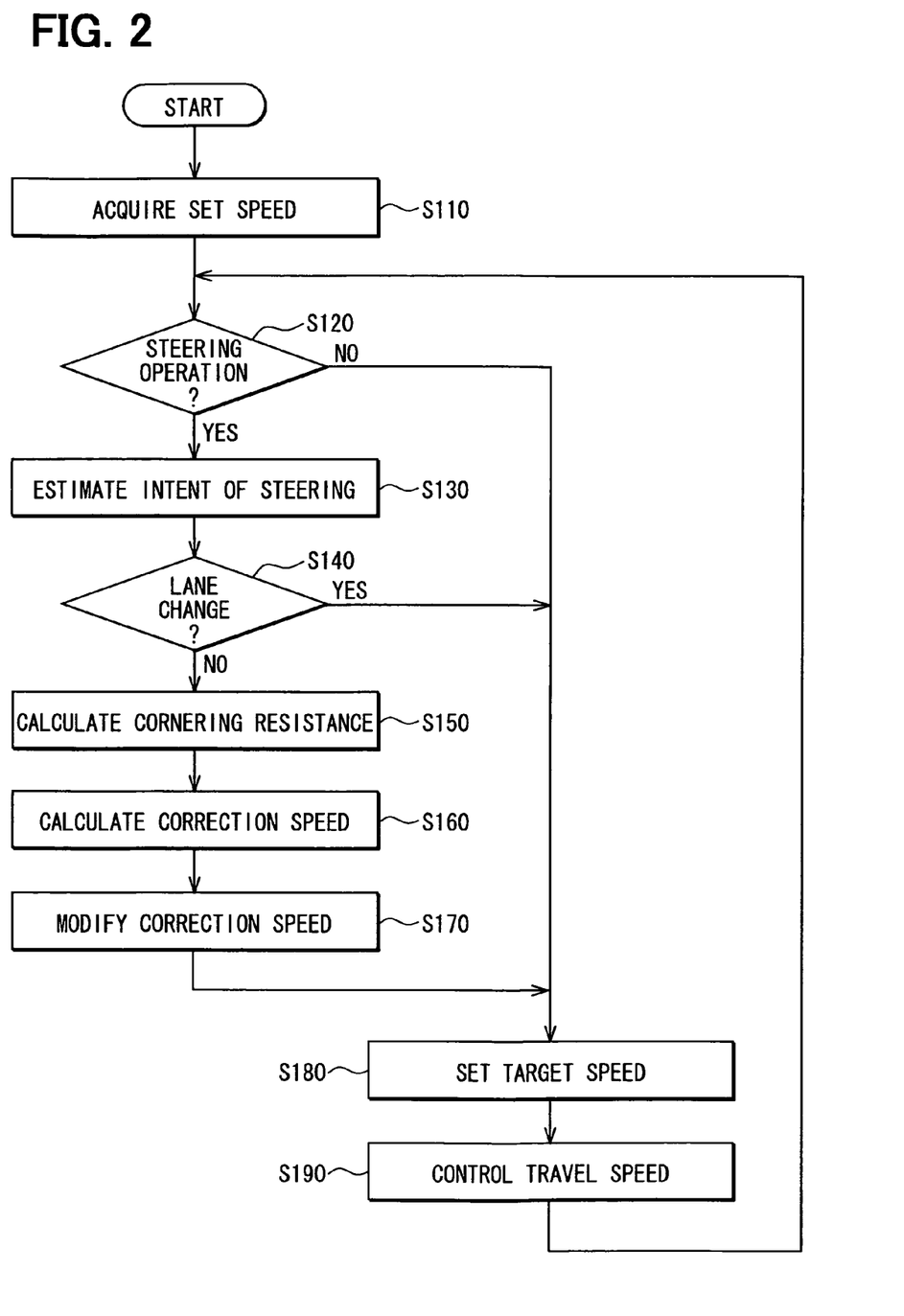
FIG. 2 is a flow chart showing processing of vehicle speed control executed by the cruise control system.

The cruise ECU 10 is programmed to execute the vehicle speed control processing as shown in FIG. 2.

The vehicle speed control processing is activated by turning on a main switch by a driver. When it is activated, first at S110 a set vehicle speed stored in ROM of the cruise ECU 10 is transferred to RAM of the cruise ECU 10, thus acquiring a set vehicle speed. When an accelerator lever, a coast lever or the like is operated, the set vehicle speed transferred to RAM is changed in response to signals from the levers. That is, at S110, input for making a driver of the vehicle set a set vehicle speed is received.

Next, at S120 it is checked whether the steering wheel is operated depending on a steering angle from the brake ECU 15. When the steering wheel is operated (YES), the processing proceeds to S130. At S130, a driver's intent in the operation of the steering wheel is estimated. More specially, it is estimated whether the operation of the steering wheel is performed for changing a vehicle lane of the vehicle, as a driver's intent.

At S140, it is checked at S130 whether a driver's intent of the steering is for changing the travel lane. As a result of the determination, when the operation of the steering wheel is not for changing the vehicle lane of the vehicle (NO), but it is for turning right or left at the traffic crossing or for traveling at the curve, for instance, the processing proceeds to S150.

In regard to a method of estimating a driver's intent in the operation of the steering wheel, first, it may be checked whether the vehicle is positioned within a prescribed distance prescribed in advance from a traffic crossing (for example, 30 m to the traffic crossing) based upon position information and traffic crossing information received from the navigation unit 6. Further, in a case where the vehicle is not positioned within the prescribed distance from the traffic crossing and also an operation signal from the turn signal operation detection unit 8 indicates that the turn signal is operated, it is determined that the operation of the steering wheel is made for changing the vehicle lane of the vehicle as a driver's intent when the steering wheel is operated.

At S150, a cornering resistance is calculated as described with reference to FIG. 7 based upon a steering angle and a yaw rate received from the brake ECU 15, and a present vehicle speed and a slip ratio between a tire and a road surface received from the power train ECU 20. The cornering resistance becomes a larger value as the steering angle of the vehicle increases. Further, the acceleration in a direction of decelerating the vehicle (deceleration) is calculated based upon the calculated cornering resistance and the vehicle weight (mass of vehicle) defined in advance for each kind of vehicles.

Next, at S160, a speed reduction amount to be reduced from the set vehicle speed due to the cornering resistance is calculated as a correction vehicle speed based upon the deceleration calculated at S150. That is, since a speed (that is, speed reduction amount) which is to be reduced at the time the vehicle travels at the curve should increase as the deceleration (including the cornering resistance) increases, the correction vehicle speed calculated at S160 is calculated to increase.

Further, at S170, the correction vehicle speed calculated at S160 is modified based upon an index other than the cornering resistance.

Figure 3:
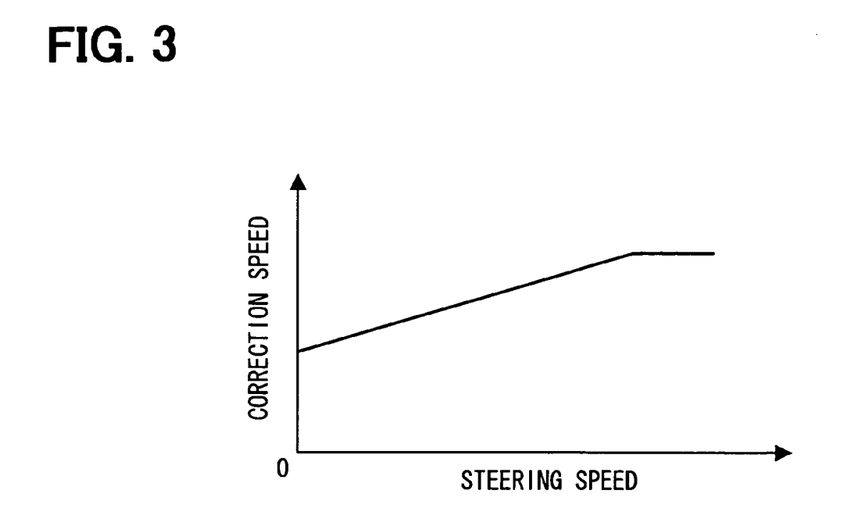
FIG. 3 is a graph showing an example of a relation between a steering speed and a correction vehicle speed.

More specially, as shown in FIG. 3, the correction vehicle speed is modified according to the steering speed received from the brake ECU 15 so that a value of the correction vehicle speed becomes larger as the steering speed is higher.

Next, at S180, a vehicle speed calculated by subtracting the correction vehicle speed modified at S170 from the set vehicle speed is set as a target vehicle speed.

It should be noted that in a case where it is determined NO at S120 that the steering wheel is not operated or in a case where it is determined YES at S140 that the driver's intent of the steering is considered to be the vehicle lane change, the set vehicle speed is set as the target vehicle speed without calculating the cornering resistance.

Further, at S190, it is checked whether the vehicle travels at a vehicle speed within a permissible speed range defined in advance from the target vehicle speed set at S180, based upon the present actual vehicle speed received from the power train ECU 20. When the vehicle does not travel within the permissible speed range from the target vehicle speed, the target acceleration is calculated. Then, for realizing the target acceleration (target vehicle speed), the target acceleration and the control command value are transmitted to the brake ECU 15 or the power train ECU 20, so that the vehicle speed is feedback-controlled in the known manner to attain the target vehicle speed, which is reduced at the corner.

The above processing is repeated from S120.

It should be noted that the vehicle speed control includes both of the following controls. One is cruise control of maintaining a vehicle speed within a permissible speed range from a target vehicle speed in a state where a preceding vehicle traveling in the travel direction of the vehicle does not exist. The other is an adaptive cruise control (ACC) of determining a preceding vehicle based upon object information received from the forward monitor unit 5 (that is, radar sensor) to appropriately maintain an inter-vehicle distance to and from the preceding vehicle. In a case where the vehicle speed control to be performed is the adaptive cruise control, the vehicle speed found based upon the object received from the forward monitor unit 5 is set as the set vehicle speed set at S110 for following the preceding vehicle.

Figure 4:
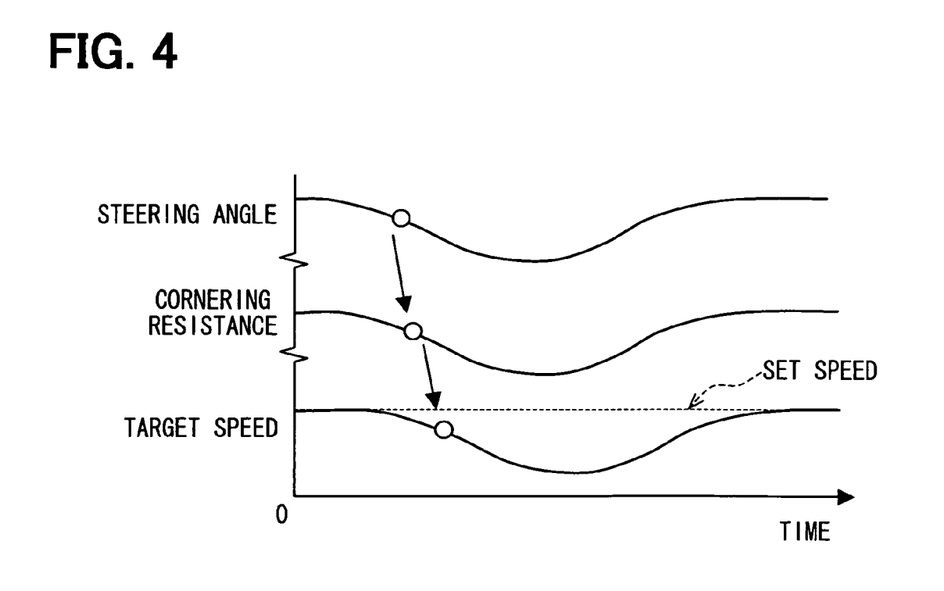
FIG. 4 is an operation diagram showing an operation of the vehicle speed control using the relation shown in FIG. 3.

The operation of the above cruise control is shown in FIG. 4. For example, in a case where a vehicle travels at the curve or in a case where the vehicle turns right or left at the traffic crossing (the vehicle is in the middle of turning), a steering angle, finally a steering angle of the steered vehicle wheel changes due to the operation of the steering wheel (the steering angle in the figure changes). Therefore, with some time delay, the cornering resistance applied to the vehicle also changes correspondingly and the deceleration applied to the vehicle also changes to change a speed reduction of the vehicle. The change in the target speed increases as the change in the steering angle increases.

Accordingly, in the cruise control system, when the vehicle is in the middle of turning, the cornering resistance applied to the vehicle and further the deceleration are calculated based upon a steering angle or the like from the brake ECU 15. In addition, a speed reduction amount of the vehicle due to the calculated cornering resistance (more accurately, deceleration) is calculated as a correction vehicle speed, and a target vehicle speed is set so that a speed of the vehicle becomes lower as the cornering resistance becomes larger by subtracting the correction vehicle speed from the set vehicle speed.

That is, in the cruise control system, the target vehicle speed is set in consideration of the speed reduction amount from the set vehicle speed due to the cornering resistance.

It should be noted that in the vehicle speed control processing according to the present embodiment, S150 corresponds to a resistance estimating means, S180 corresponds to a target vehicle speed setting means, S190 corresponds to a travel speed control means, S160 corresponds to a correction vehicle speed setting means, S170 corresponds to a vehicle speed correcting means and S130 corresponds to a steering intent estimating means.

As described above, since a target vehicle speed is set in consideration of a speed reduction amount, acceleration of a vehicle for compensating for a speed reduction amount from a set vehicle speed due to a cornering resistance is not caused. Therefore, this cruise control system causes rapid acceleration of the vehicle in the middle of turning to be reduced. In consequence, according to the cruise control system, behaviors of the vehicle in the middle of turning, for example, as in the case of traveling at the curve or turning right or left at the traffic crossing can be made suitable for a driver's feeling.

Particularly, because of setting the target vehicle speed in accordance with the cornering resistance, even in a case where the vehicle travels in a low speed, behaviors of the vehicle in the middle of turning can be made suitable to match a driver's feeling.

Further, since the correction vehicle speed is modified so that the target vehicle speed closer to the set vehicle speed is realized as the steering speed is lower, even in a case where the vehicle travels in a high speed and is in the middle of turning, behaviors of the vehicle can be made suitable for a driver's feeling.

In addition, in a case where it is estimated that the vehicle changes a vehicle lane, since the set vehicle speed is made to the target vehicle speed without calculating the cornering resistance, the change of the vehicle lane can be smoothly performed.

It should be noted that not only in the middle of performing the cruise control but also in the middle of performing the adaptive cruise control, the target vehicle speed is reduced in response to the cornering resistance at the time of traveling at the curve.

Therefore, for example, even if the preceding vehicle enters into the curve in an over-speed condition, the subject vehicle can safely travel at the curve without following the preceding vehicle in the over-speed condition. For example, even in a case where the preceding vehicle travels in a low speed and the target inter-vehicle distance is set short, it can be prevented for the subject vehicle to follow the preceding vehicle too closely, without causing uneasiness to a driver and other passengers in the vehicle.

OTHER EMBODIMENT

Figure 5A:
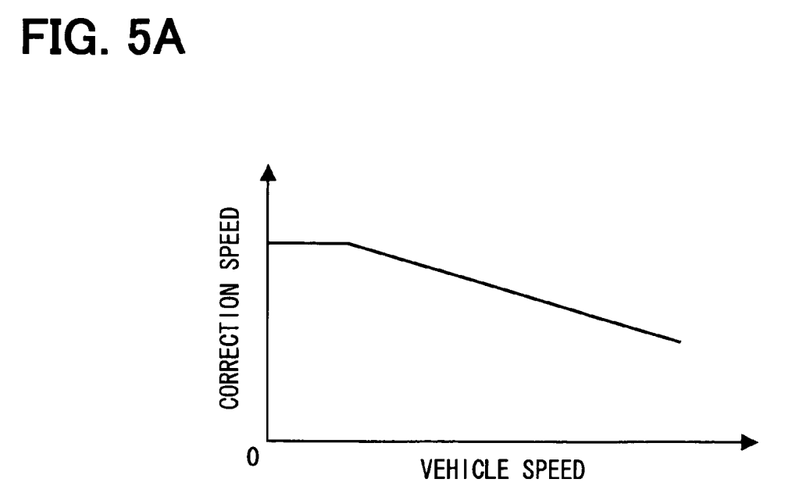
FIGS. 5A and 5B are graphs and operation diagrams showing another example of a relation between a vehicle speed and a correction vehicle speed, and an operation of the vehicle speed control using the relation shown in FIG. 5A.

Differently from the first embodiment, as shown in FIG. 5A, a correction vehicle speed may be modified to decrease as a present vehicle speed from the power train ECU 20 is higher, so that a target vehicle speed is set closer to the set vehicle speed.

Figure 5B:
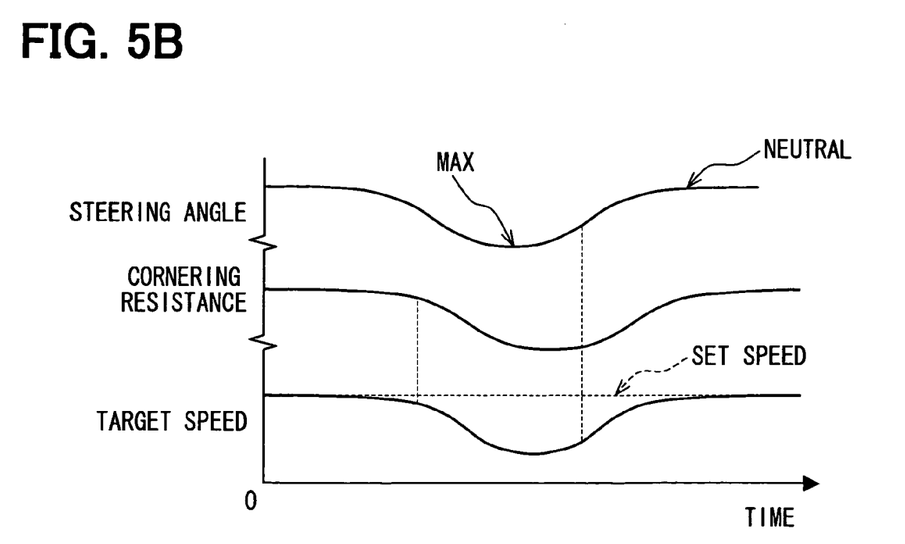

In a case of a steering angle at the time a vehicle travels straight as a neutral steering angle and a largest steering angle at the time the vehicle is in the middle of turning as a maximum steering angle, when the steering angle from the brake ECU 15 represents that the steering wheel is returned from the maximum steering angle to the neutral steering angle as shown in FIG. 5B, the correction vehicle speed may be modified so that, as the steering angle comes closer to the neutral steering angle, the target vehicle speed is set closer to the set vehicle speed.

Particularly, according to the present cruise control system, since the target vehicle speed is set closer to the set vehicle speed as the steering angle comes closer to the neutral steering angle, the vehicle speed can be returned to the set vehicle speed more quickly after a road where the subject vehicle travels is switched from a curve to a straight road. Therefore, behaviors of the vehicle at the time of the switching from the curve to the straight road can be more suitable for a driver's feeling.

Figure 6A:
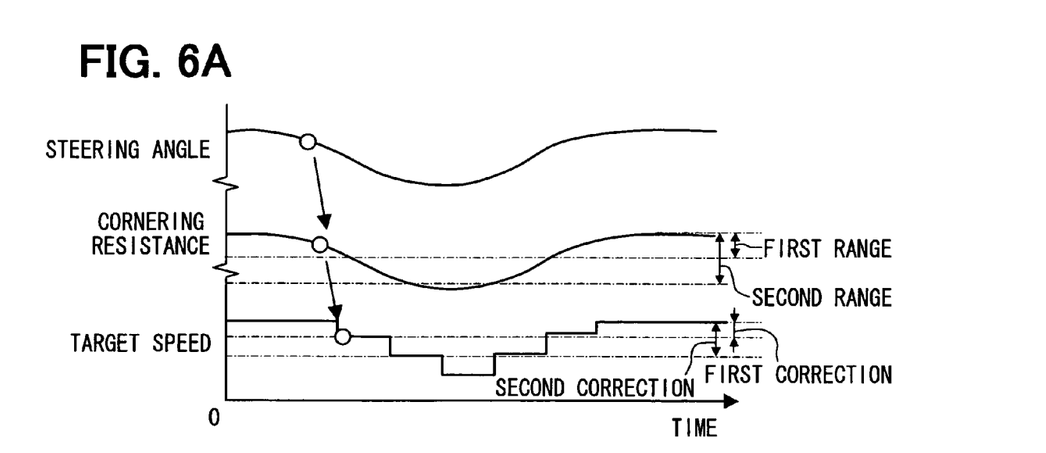
FIGS. 6A, 6B and 6C are operation diagrams showing different examples of vehicle speed control.

In addition, the correction vehicle speed may be calculated in a different way. For example, as shown in FIG. 6A, when the cornering resistance is within a first range prescribed in advance, the correction vehicle speed may be set as a first correction vehicle speed. When the cornering resistance is within a second range larger than the first range, the correction vehicle speed may be calculated in such a manner as to be a second correction vehicle speed larger than the first correction vehicle speed.

Figure 6B:
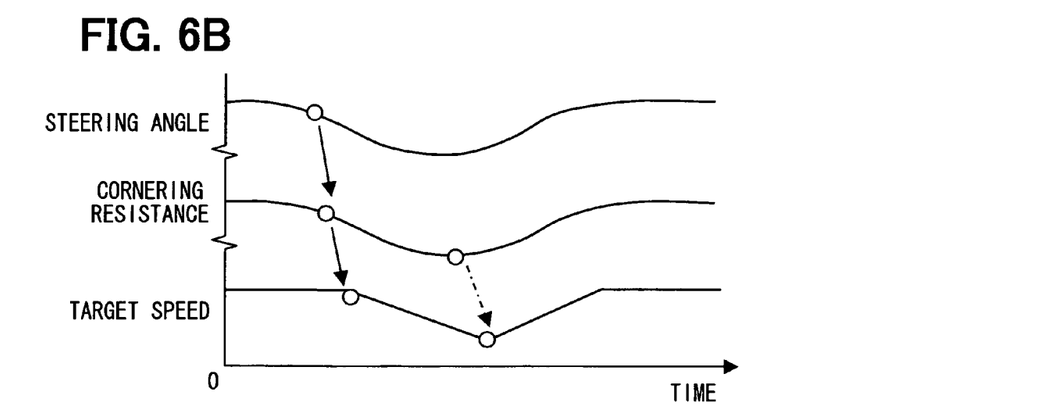
Figure 6C:
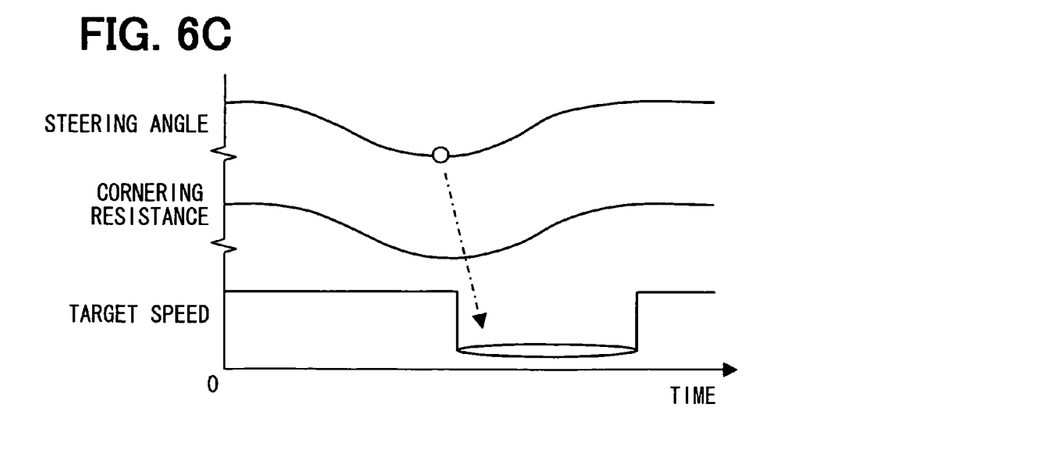

As shown in FIG. 6B, the correction vehicle speed may be calculated in response to an increase/decrease of the cornering resistance according to a change rate prescribed in such a manner as to become larger as the cornering resistance is larger. Further, as shown in FIG. 6C, a magnitude of the correction vehicle speed and time for subtracting the correction vehicle speed from the set vehicle speed may be set in accordance with the maximum steering angle without variations.

That is, a method of calculating a correction vehicle speed may adopt any methods as long as it is possible to set a reduction of the target vehicle speed so that a difference from the prescribed set vehicle speed becomes larger as the cornering resistance is larger.

Many other modifications are possible.

For instance, a target vehicle speed may be directly calculated based upon a cornering resistance in place of calculation in the first embodiment.

At the time the vehicle changes the vehicle lane and also no other vehicle exists in the surroundings of the vehicle, a set vehicle speed may be set as a target vehicle speed without estimating the intent of steering. In this case, however, it may be necessary to provide a sensor (for example, an in-vehicle camera for photographing the backward or the side of the vehicle or the like) for viewing around the vehicle.

The forward monitor unit 5 may be a millimeter-wave unit for emitting electric waves in the forward of the vehicle, an in-vehicle camera for photographing the forward of the vehicle or any combination thereof, including the laser radar sensor.

The power train ECU 20 may control a transmission. In addition, in a case of an electric vehicle or a hybrid vehicle, it may control an electric motor or power supply. That is, any control object may be possible as long as acceleration and deceleration of a vehicle is possible to realize a target vehicle speed.

The cruise control system may perform only one of the cruise control and the adaptive cruise control.

What is claimed is:

1. A cruise control system for a vehicle comprising:
   a resistance estimating unit which estimates a cornering resistance generated when a vehicle turns, based upon vehicle information including at least a steering angle and a vehicle speed acquired at the turning of the vehicle;
   a target vehicle speed setting unit which sets a target vehicle speed so that a difference between the target vehicle speed and a set vehicle speed set at the time the vehicle travels without turning becomes larger as the cornering resistance estimated by the resistance estimating unit is larger; and
   a control unit which accelerates and decelerates the vehicle so that a vehicle speed is maintained within a permissible speed range defined based upon the target vehicle speed set by the target vehicle speed setting unit; wherein
   the target vehicle speed setting unit includes a correction vehicle speed setting unit which sets a correction vehicle speed which becomes larger as the cornering resistance estimated by the resistance estimating unit is larger; and the target vehicle speed setting unit sets the target vehicle speed by subtracting the correction vehicle speed from the set vehicle speed.

2. The cruise control system according to claim 1, wherein: the correction vehicle speed setting unit includes a vehicle speed correcting unit which corrects the correction vehicle speed in accordance with an index acquired as the index other than the cornering resistance estimated by the resistance estimating unit.

3. The cruise control system according to claim 2, wherein: the vehicle speed correcting unit sets the vehicle speed as the index, and corrects the correction vehicle speed in such a manner as to become smaller as the vehicle speed is higher.

4. The cruise control system according to claim 2, wherein: the vehicle speed correcting unit sets a steering speed as an operation speed of a steering wheel as the index, and corrects the correction vehicle speed in such a manner as to become larger as the steering speed is larger.

5. The cruise control system according to claim 2, wherein: the vehicle speed correcting unit sets a steering angle as the index, sets a steering angle at the time the vehicle travels straight as a neutral steering angle, sets a largest steering angle at the time the vehicle turns as the maximum steering angle, and corrects the correction vehicle speed to be smaller as the steering angle comes closer to the neutral steering angle when the steering angle represents that the steering wheel is returned from the maximum steering angle to the neutral steering angle.

6. The cruise control system according to claim 1, further comprising:
a steering intent estimating unit which acquires information including information on an operation of a turn signal and information on a present position of the vehicle and a shape of a travel road where the vehicle travels to estimate a driver's steering intent based upon the acquired information,
wherein the target vehicle speed setting unit sets the set vehicle speed as the target vehicle speed regardless of the cornering resistance estimated by the resistance estimating unit when the steering intent estimated by the steering intent estimating unit represents a vehicle lane change of the vehicle.

7. The cruise control system according to claim 1, wherein: the resistance estimating unit estimates the cornering resistance based on a vehicle weight of the vehicle and a slip ratio between a tire of the vehicle and a road surface.

8. The cruise control system according to claim 6, wherein: the target vehicle speed is corrected by a correction vehicle speed which is variable in accordance with an index acquired as the index other than the cornering resistance estimated by the resistance estimating unit.

9. The cruise control system according to claim 8, wherein: the index includes the vehicle speed, and the correction vehicle speed is varied in such a manner as to become smaller as the vehicle speed is higher.

10. The cruise control system according to claim 8, wherein:
the index includes a steering speed as an operation speed of a steering wheel, and the correction vehicle speed is varied in such a manner as to become larger as the steering speed is larger.

11. The cruise control system according to claim 8, wherein:
the index includes a steering angle, which takes a neutral steering angle at the time the vehicle travels straight and a largest steering angle at the time the vehicle turns as the maximum steering angle; and
the correction vehicle speed is varied to be smaller as the steering angle comes closer to the neutral steering angle when the steering angle represents that the steering wheel is returned from the maximum steering angle to the neutral steering angle.

12. A cruise control method for a vehicle, the method comprising:
setting, using a target vehicle speed setting unit, a target vehicle speed so that a difference between the target vehicle speed and a set vehicle speed set when the vehicle travels straight becomes larger as a speed reduction amount of the vehicle caused when the vehicle turns is larger;
controlling the vehicle to accelerate and decelerate so that a vehicle speed is maintained within a permissible speed range defined based upon the target vehicle speed;
estimating a cornering resistance generated when the vehicle turns, based upon vehicle information including at least a steering angle and a vehicle speed acquired at the turning of the vehicle,
wherein the difference between the set vehicle speed and the target vehicle speed is increased as an estimated cornering resistance is larger.

13. The cruise control system according to claim 1, wherein the target vehicle speed setting unit continuously changes the target vehicle speed when the vehicle turns.

14. The cruise control method according to claim 12, further comprising continuously changing the target vehicle speed when the vehicle turns.

* * * * *